(12) United States Patent
Morimoto (10) Patent No.: US 9,794,524 B2
(45) Date of Patent: Oct. 17, 2017

(54) IN-VEHICLE MONITORING SYSTEM AND IN-VEHICLE MONITORING METHOD

(71) Applicant: Kazunari Morimoto, Tokyo (JP)

(72) Inventor: Kazunari Morimoto, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 185 days.

(21) Appl. No.: 14/435,484

(22) PCT Filed: Jan. 10, 2013

(86) PCT No.: PCT/JP2013/050338
§ 371 (c)(1),
(2) Date: Apr. 14, 2015

(87) PCT Pub. No.: WO2014/109039
PCT Pub. Date: Jul. 17, 2014

(65) Prior Publication Data
US 2015/0281652 A1     Oct. 1, 2015

(51) Int. Cl.
*H04N 7/18*       (2006.01)
*H04L 29/08*      (2006.01)
(Continued)

(52) U.S. Cl.
CPC .......... *H04N 7/181* (2013.01); *B61L 15/0081* (2013.01); *B61L 23/00* (2013.01);
(Continued)

(58) Field of Classification Search
None
See application file for complete search history.

(56) References Cited

U.S. PATENT DOCUMENTS

| | | | | |
|---|---|---|---|---|
| 5,712,658 A | * | 1/1998 | Arita | G06F 3/0386 345/158 |
| 7,558,564 B2 | * | 7/2009 | Wesby | G06Q 40/00 340/514 |

(Continued)

FOREIGN PATENT DOCUMENTS

| | | |
|---|---|---|
| EP | 2 290 979 A1 | 3/2011 |
| JP | 3-224099 A | 10/1991 |

(Continued)

OTHER PUBLICATIONS

Extended European Search Report dated Sep. 27, 2016, issued by the European Patent Office in corresponding European Application No. 13871282.3. (10 pages).

(Continued)

*Primary Examiner* — Mohammad J Rahman
(74) *Attorney, Agent, or Firm* — Buchanan Ingersoll & Rooney PC (57) ABSTRACT

An in-vehicle monitoring system including monitoring cameras and emergency call devices, a display unit, and an information control device, and monitoring inside of a vehicle by using images taken by the monitoring cameras, wherein a table, in which IP addresses of the emergency call devices and IP addresses of the monitoring cameras are stored in association with each other in a one-to-one relationship or a one-to-many relationship, is set in the information control device, and upon receiving a call signal from an operated emergency call device, the information control device specifies an IP address of a monitoring camera corresponding to the operated emergency call device from the IP addresses of the monitoring cameras based on the table, selects imaging data from the specified monitoring camera from pieces of imaging data from the monitoring cameras, and transmits it to the display unit.

8 Claims, 9 Drawing Sheets

(51) Int. Cl.
 *H04N 7/08* (2006.01)
 *B61L 23/00* (2006.01)
 *B61L 15/00* (2006.01)
 *H04W 84/00* (2009.01)

(52) U.S. Cl.
 CPC .............. *H04L 67/12* (2013.01); *H04L 67/22* (2013.01); *H04N 7/0806* (2013.01); *H04W 84/005* (2013.01)

(56) References Cited

U.S. PATENT DOCUMENTS

| | | | | |
|---|---|---|---|---|
| 8,264,539 | B2* | 9/2012 | Takada | H04N 5/76 348/143 |
| 2004/0105450 | A1 | 6/2004 | Ikuta et al. | |
| 2004/0184773 | A1* | 9/2004 | Lim | H04N 5/765 386/231 |
| 2008/0043641 | A1* | 2/2008 | Wilson | H04L 12/4641 370/259 |
| 2008/0151884 | A1* | 6/2008 | Elberbaum | H04L 29/12216 370/389 |
| 2010/0091663 | A1* | 4/2010 | Takeyama | H04L 12/4625 370/242 |
| 2011/0058036 | A1* | 3/2011 | Metzger | H04N 7/181 348/143 |
| 2012/0013936 | A1* | 1/2012 | Sawada | G06K 15/402 358/1.14 |
| 2012/0122418 | A1* | 5/2012 | Hicks, III | G08B 25/001 455/404.1 |
| 2012/0144421 | A1* | 6/2012 | Kuroda | G06Q 30/02 725/36 |
| 2013/0058253 | A1* | 3/2013 | Maruta | H04L 12/4625 370/254 |
| 2013/0113934 | A1* | 5/2013 | Hotta | G06K 9/00778 348/143 |

FOREIGN PATENT DOCUMENTS

| | | |
|---|---|---|
| JP | 9-050586 A | 2/1997 |
| JP | 2001-312238 A | 11/2001 |
| JP | 2002-157669 A | 5/2002 |
| JP | 2004-135082 A | 4/2004 |
| JP | 2004-172780 A | 6/2004 |
| JP | 2007-300386 A | 11/2007 |
| JP | 2009-056921 A | 3/2009 |
| JP | 2009-171295 A | 7/2009 |
| JP | 2009-278298 A | 11/2009 |
| JP | 2012-129907 A | 7/2012 |
| JP | 2012-217088 A | 11/2012 |

OTHER PUBLICATIONS

International Search Report (PCT/ISA/210) dated Apr. 9, 2013, by the Japanese Patent Office as the International Searching Authority for International Application No. PCT/JP2013/050338.
Written Opinion (PCT/ISA/237) dated Apr. 9, 2013, by the Japanese Patent Office as the International Searching Authority for International Application No. PCT/JP2013/050338.

* cited by examiner

| No. | MONITORING CAMERA | EMERGENCY CALL DEVICE |
|---|---|---|
| 1 | 192.168.70.1 | 192.168.70.101, 192.168.70.102, 192.168.70.103, 192.168.70.104 |
| 2 | 192.168.70.2 | 192.168.70.101, 192.168.70.102 |
| 3 | 192.168.70.3 | 192.168.70.103, 192.168.70.104 |
| 4 | 192.168.70.4 | 192.168.70.101, 192.168.70.102, 192.168.70.103, 192.168.70.104 |
| ... | ... | ... |

| No. | EMERGENCY CALL DEVICE | CAR | MULTICAST ADDRESS |
|---|---|---|---|
| 1 | 192.168.70.101 | 1 | 239.0.0.101, 239.0.0.102, 239.0.0.104 |
| 2 | 192.168.70.102 | 1 | 239.0.0.101, 239.0.0.102, 239.0.0.104 |
| 3 | 192.168.70.103 | 1 | 239.0.0.101, 239.0.0.103, 239.0.0.104 |
| 4 | 192.168.70.104 | 1 | 239.0.0.101, 239.0.0.103, 239.0.0.104 |
| ... | ... | ... | ... |

FIG.10

| No. | MONITORING CAMERA | CAR | MULTICAST ADDRESS |
|---|---|---|---|
| 1 | 192.168.70.1 | 1 | 239.0.0.101 |
| 2 | 192.168.70.2 | 1 | 239.0.0.102 |
| 3 | 192.168.70.3 | 1 | 239.0.0.103 |
| 4 | 192.168.70.4 | 1 | 239.0.0.104 |
| ... | ... | ... | ... |

FIG.11

IN-VEHICLE MONITORING SYSTEM AND IN-VEHICLE MONITORING METHOD

FIELD

The present invention relates to an in-vehicle monitoring system and an in-vehicle monitoring method for use in a railway vehicle.

BACKGROUND

It has become common in recent years to install monitoring cameras in railway vehicles to record crimes, incidents, and accidents that occur in the vehicles. There are generally three methods of checking images from the monitoring cameras.

A first checking method is to check images taken by a monitoring camera on a real-time basis by the driver or conductor via a display unit installed in the cab for checking the safety in the vehicles. This checking method is used, for example, to make sure that no object is caught in the vehicle doors or no passenger is caught in the vehicle doors, before leaving the station. A second checking method is to display image data of the images taken by a monitoring camera when a vehicle is operating on a display unit in the cab, or continuously record the image data in a recording device and, if an incident or accident occurs, use the recorded image data to check images during the period of time when the incident or the like occurs. With these two checking methods, because the images taken by the monitoring camera are displayed on the display unit in the cab, when an incident or the like occurs, the driver or the like checks the images displayed on the display unit.

A third checking method is such that when an emergency call device in a vehicle is operated, images from a monitoring camera that is taking images of the vicinity of the emergency call device are displayed on a display unit in the cab. For example, when the emergency call device is operated by a passenger when an incident or the like has occurred, the conductor or the like needs to rush to the place of the incident immediately. However, the conductor or the like may wish to check the images taken by the monitoring camera in order to quickly check the status. The third checking method is suitable for such a case. A method that can be considered, other than the method described above, for quickly checking the status when the emergency call device is operated is a method by which the vehicle and the operations room are connected via a network in order for a supervisor in the operations room to ascertain the current status.

As a monitoring operating system that can accurately recognize an incident or the like in the monitoring area, the conventional technique described in Patent Literature 1 mentioned below provides a system in which a plurality of monitoring poles are installed on the platforms or the like in the station. According to the conventional technique, when an emergency notification unit attached to the monitoring pole is operated, monitoring cameras built in other poles arranged near the operated pole is controlled such that they concentrate on taking images near the operated pole. The respective monitoring poles and an emergency operating system are connected to the monitoring control unit via a LAN.

The conventional technique described in Patent Literature 2 mentioned below provides a system in which a plurality of imaging units each including a camera, a display unit, and an emergency push button are installed in a railway vehicle, and when an abnormal situation occurs, images taken by the camera of the imaging unit whose emergency push button has been pressed are displayed on a display device in the driver's cabin.

CITATION LIST

Patent Literatures

Patent Literature 1: Japanese Patent Application Laid-open No. 2004-135082 (paragraphs [0042], [0043], and the like)

Patent Literature 2: Japanese Patent Application Laid-open No. 2001-312238 (paragraphs [0041]to [0044], FIG. 27, and the like)

SUMMARY

Technical Problem

In recent railway vehicles, in-vehicle networks are often constructed by using the Ethernet (registered trademark) because of the reduction of rigging wiring and the popularization of digital devices. Because railway vehicles are manufactured to meet various purposes, the monitoring cameras that are to be installed are installed at various angles to suit the vehicles. This means that the positional relationships between the monitoring cameras and the emergency call devices are different for each vehicle. Therefore, when the emergency call device provided at a predetermined place in a train is operated, which images from which display camera are to be displayed differs depending on the positional relationships between the monitoring cameras and the emergency call devices.

The conventional technique described in Patent Literature 1 is not a system in which it is not assumed that monitoring cameras and emergency call devices are provided in a vehicle. Also in the conventional technique, the specific relationship between a first monitoring pole by which an emergency notification has been made and a monitoring pole provided near the first monitoring pole is not disclosed.

Furthermore, although the conventional technique described in Patent Literature 2 is provided in a vehicle, with this the conventional technique, the emergency call device is integrally provided with the camera; therefore, the camera of the emergency call device whose emergency push button has been pressed can only take images near the front of the imaging unit. Further, with the conventional technique, although the display device installed in the driver's cabin, the control device of the display device, and the emergency call device are connected to one another via an in-vehicle network, they do not cooperate with one another as a system. It appears to be possible to take images of the vicinity of the imaging unit by using a camera that can change its imaging direction. However, devices mounted on a railway vehicle need to satisfy the vibration specifications of the vehicle, and such a camera cannot satisfy the vibration specifications because a movable mechanism is provided therein. Accordingly, a camera whose imaging direction is fixed is used for railway vehicles, and thus there is the problem described above.

The present invention has been achieved in view of the above problems, and an object of the present invention is to provide an in-vehicle monitoring system and an in-vehicle monitoring method with which more detailed images of an in-vehicle status are taken and the taken images are caused to be displayed.

Solution to Problem

In order to solve the above problems and achieve the object, an aspect of the present invention is an in-vehicle monitoring system that comprises: a plurality of monitoring cameras and a plurality of emergency call devices mounted on a vehicle of a train; a display unit that displays information transferred within the vehicle; and an information control device that transmits imaging data from the monitoring cameras to the display unit, and that monitors inside of the vehicle by using images taken by the monitoring cameras, wherein a table, in which IP addresses of the emergency call devices and IP addresses of the monitoring cameras are stored in association with each other in a one-to-one relationship or a one-to-many relationship, is set in the information control device, and upon receiving a call signal from an operated emergency call device, the information control device specifies an IP address of a monitoring camera corresponding to the operated emergency call device from IP addresses of the monitoring cameras on a basis of the table, selects imaging data from specified monitoring camera from pieces of imaging data from the monitoring cameras, and transmits selected imaging data to the display unit.

Advantageous Effects of Invention

According to the present invention, monitoring cameras and emergency call devices cooperate with each other by using an in-train network; therefore, an effect is obtained where more detailed images of an in-vehicle status can be taken and the taken images can be caused to be displayed.

DESCRIPTION OF EMBODIMENTS

Exemplary embodiments of an information control device, an in-vehicle monitoring system, and an in-vehicle monitoring method according to the present invention will be explained below in detail with reference to the accompanying drawings. The present invention is not limited to the embodiments.

First Embodiment.

Figure 1:
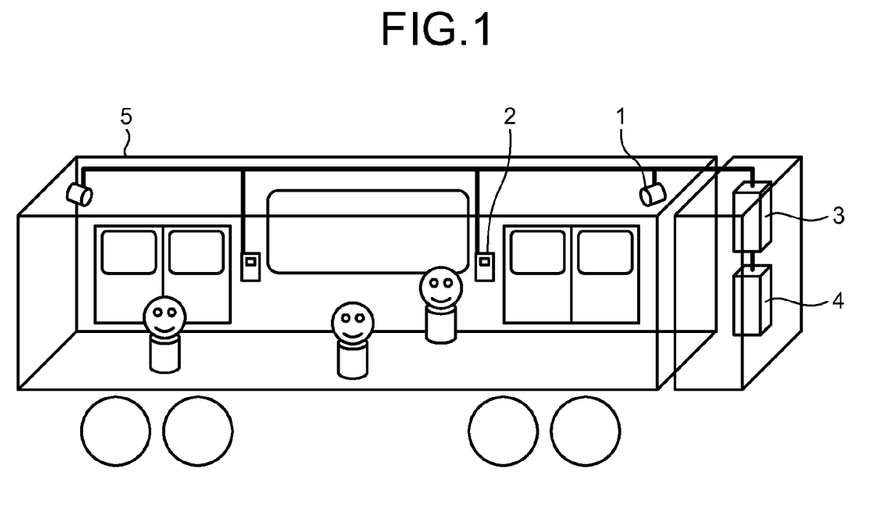
FIG. 1 is a diagram showing a railway vehicle on which constituent devices of an in-vehicle monitoring system according to a first embodiment of the present invention are mounted.
Figure 2:
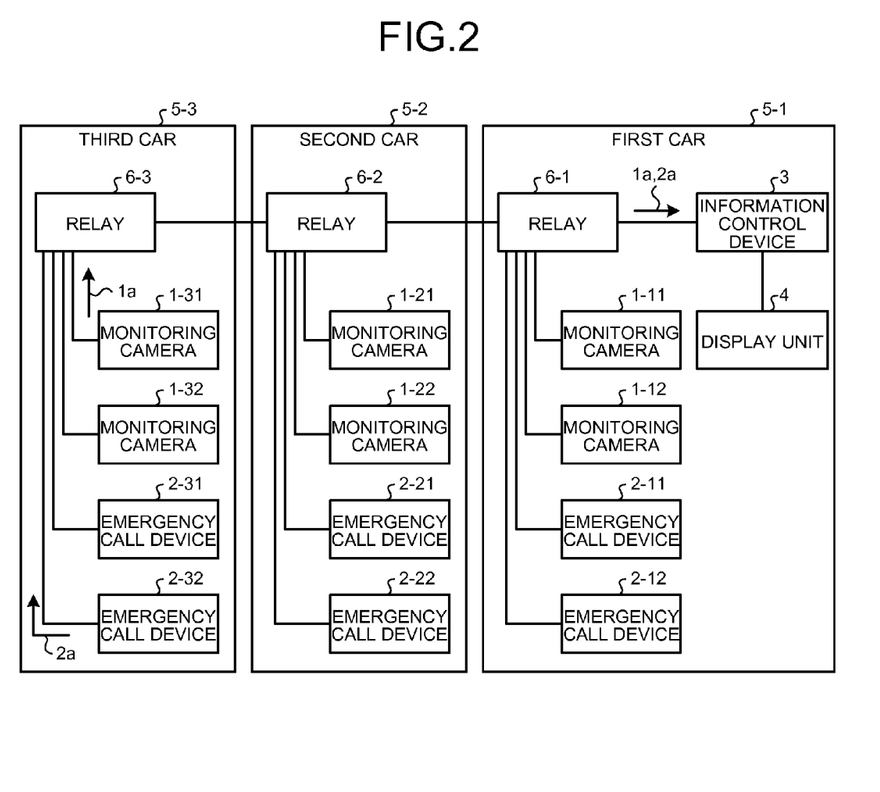
FIG. 2 is a configuration diagram of the in-vehicle monitoring system.
Figure 3:
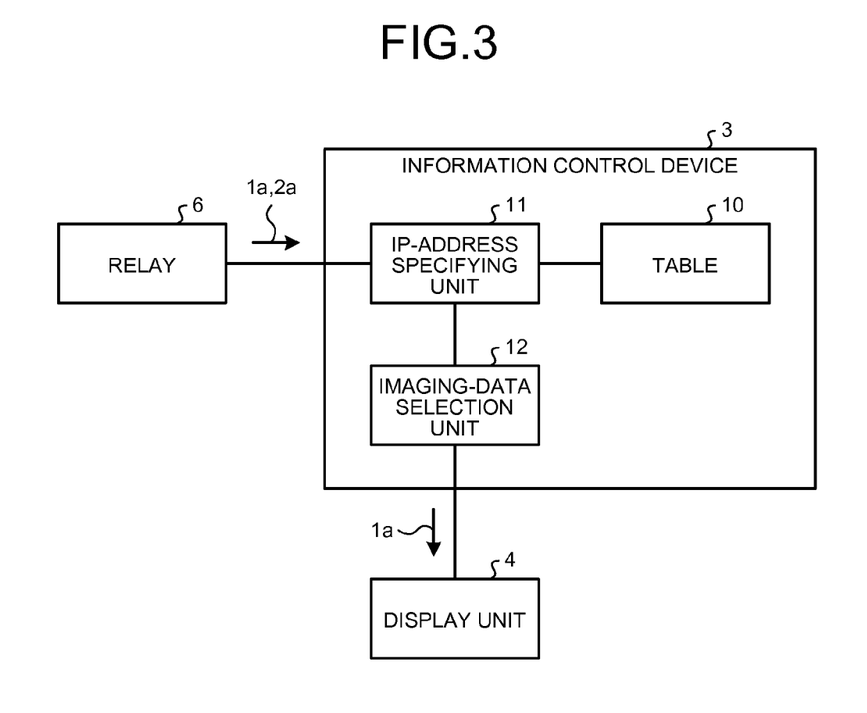
FIG. 3 is a configuration diagram of an information control device.
Figure 4:
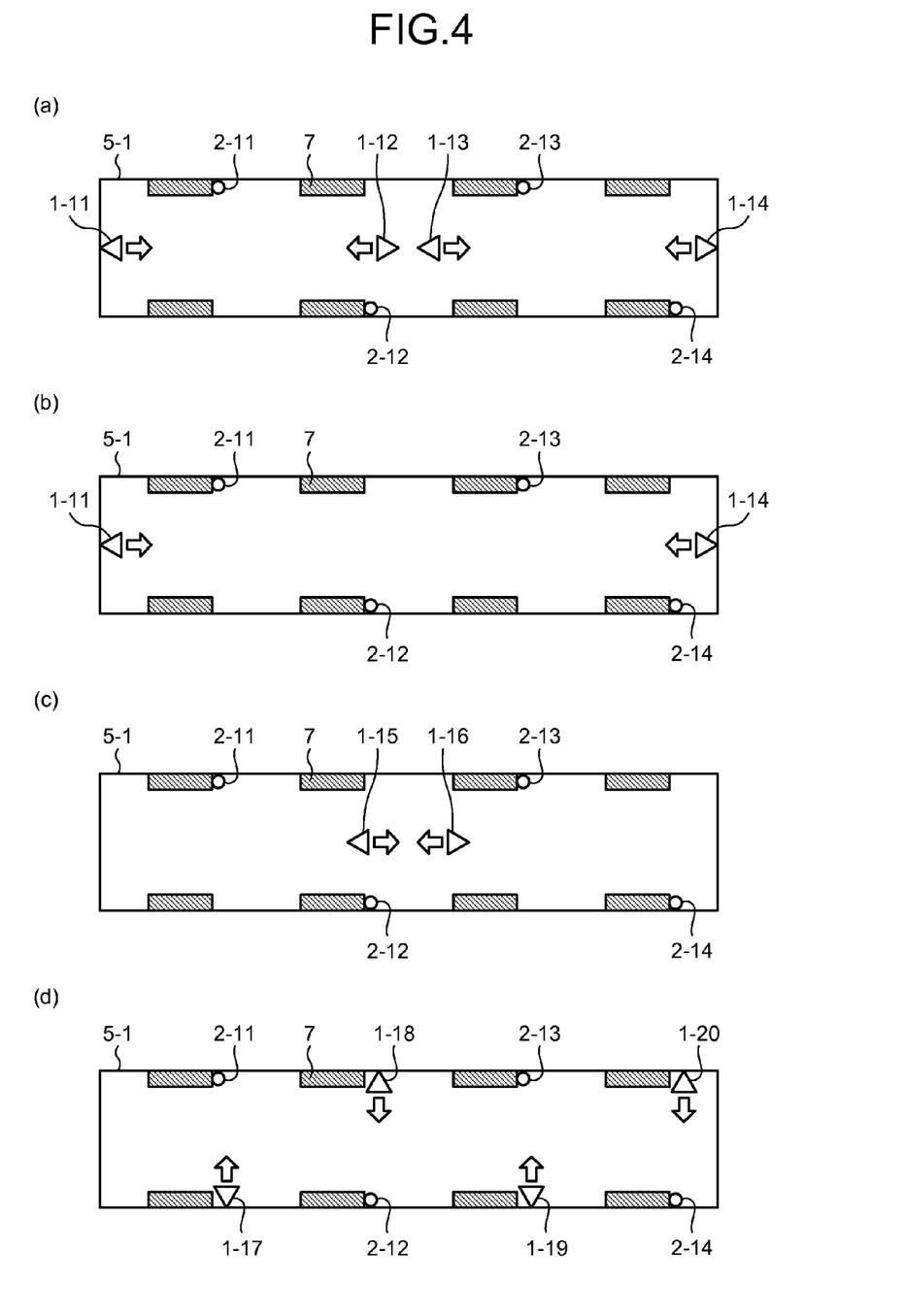
FIG. 4 is a diagram showing installation examples of a plurality of monitoring cameras and a plurality of emergency call devices.
Figure 5:
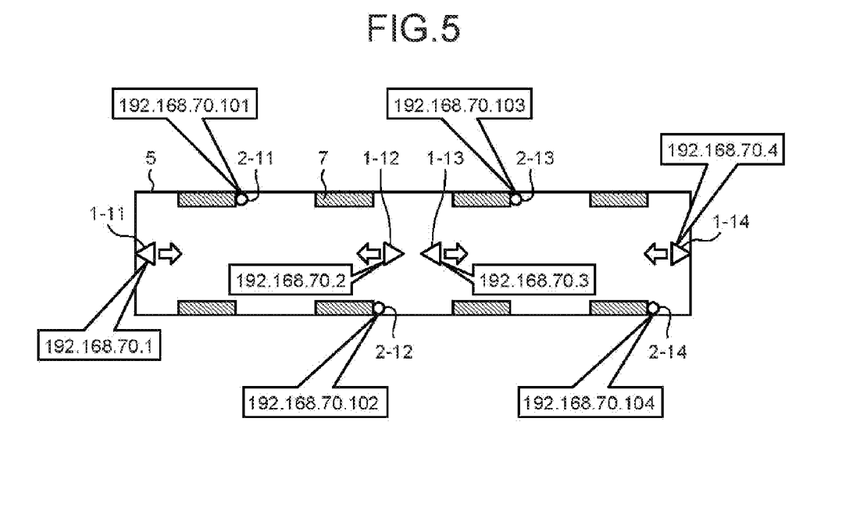
FIG. 5 is a diagram showing examples of IP addresses set in the monitoring cameras and the emergency call devices.
Figure 6:
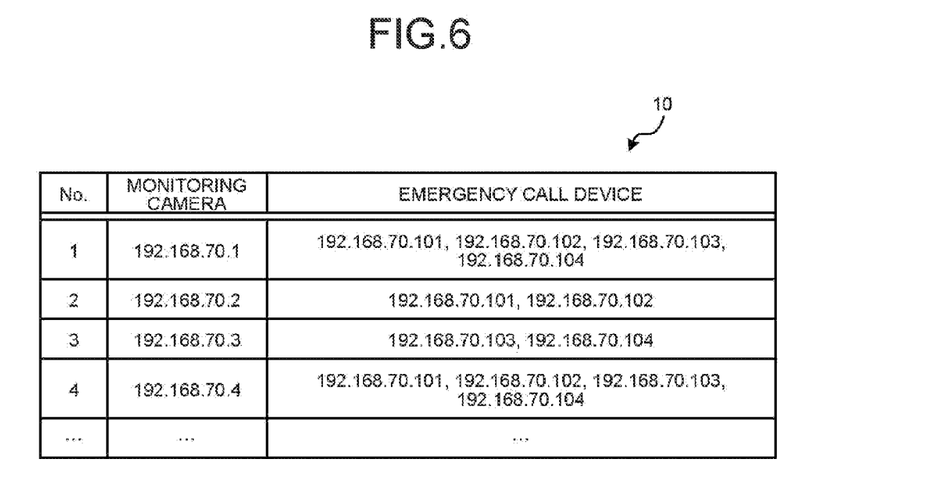
FIG. 6 is a diagram showing a table set in the information control device.
Figure 7:
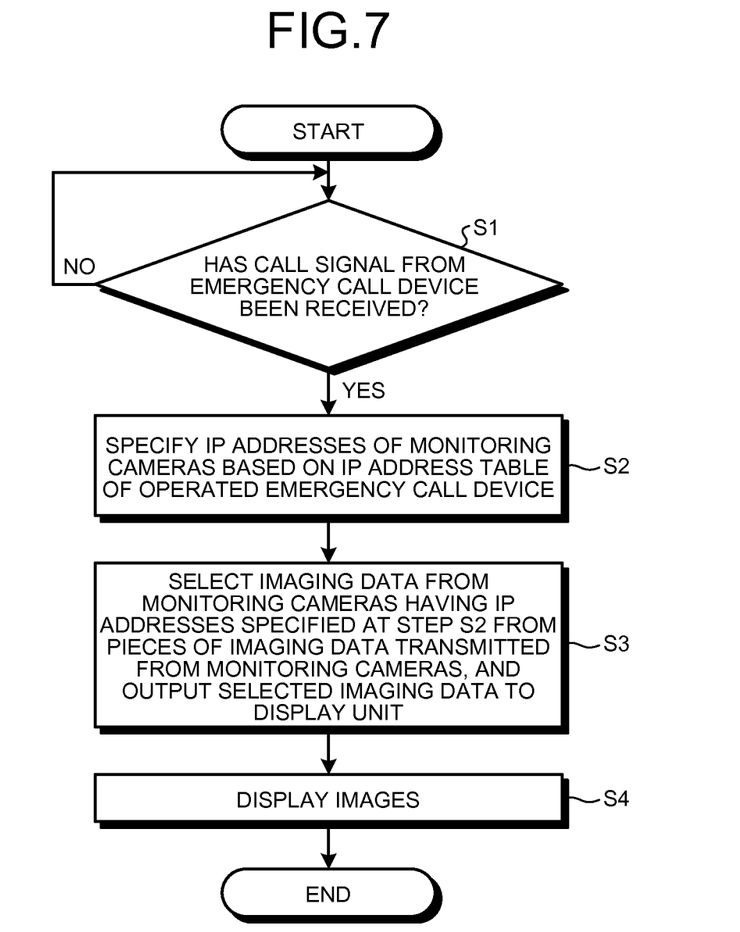
FIG. 7 is a flowchart showing an operation of the in-vehicle monitoring system according to the first embodiment of the present invention.

FIG. 1 is a diagram showing a railway vehicle on which constituent devices of an in-vehicle monitoring system according to a first embodiment of the present invention are mounted. FIG. 2 is a configuration diagram of the in-vehicle monitoring system. FIG. 3 is a configuration diagram of an information control device. FIG. 4 is a diagram showing installation examples of a plurality of monitoring cameras and a plurality of emergency call devices. FIG. 5 is a diagram showing examples of IP addresses set in the monitoring cameras and the emergency call devices. FIG. 6 is a diagram showing a table set in an information control device 3. FIG. 7 is a flowchart showing an operation of the in-vehicle monitoring system according to the first embodiment of the present invention.

In a vehicle 5 shown in FIG. 1, as an example of devices mounted on a train, a display unit 4 installed in a cab, a monitoring camera 1, an emergency call device 2, and the information control device 3, which controls communication between the monitoring camera 1 and the display unit 4, are installed.

The display unit 4 displays railway traffic information transmitted from each of the devices via a relay 6. The information includes, for example, information on the state of the devices mounted on the train and imaging data of images taken by the monitoring camera 1. The display unit 4 having received the imaging data restores the images taken by the monitoring camera 1 and displays the images. A touch panel that receives an operation corresponding to, for example, a contact position is arranged on the display screen of the display unit 4.

The monitoring camera 1 takes images of the inside or outside of the vehicle, encodes the images taken by the monitoring camera 1 into electronic data, and sends this data to the in-vehicle communication path as imaging data. The emergency call device 2 is, for example, for a passenger to call a crew member when an emergency occurs in the vehicle and transmits a call signal 2a to the information control device 3 by an input operation. The call signal 2a includes the IP address of the emergency call device 2.

In FIG. 2, for example, the display unit 4, the information control device 3, a relay 6-1, a plurality of monitoring cameras 1-11 and 1-12, and a plurality of emergency call devices 2-11 and 2-12 are installed in a vehicle 5-1 (a first car). For example, a relay 6-2, a plurality of monitoring cameras 1-21 and 1-22, and a plurality of emergency call devices 2-21 and 2-22 are installed in a vehicle 5-2 (a second car). In a similar manner, for example, a relay 6-3, a plurality of monitoring cameras 1-31 and 1-32, and a plurality of emergency call devices 2-31 and 2-32 are installed in a vehicle 5-3 (a third car).

For example, at least one relay 6 is installed in each vehicle. The relays 6 are connected to each other via an inter-vehicle communication path and each have a function of communicating information to be transferred between the vehicles. The information control device 3, the monitoring cameras 1-11 and 1-12, and the emergency call devices 2-11 and 2-12 are connected to the relay 6-1 via the in-vehicle communication path. The monitoring cameras 1-21 and 1-22 and the emergency call devices 2-21 and 2-22 are connected to the relay 6-2 via the in-vehicle communication path. In a similar manner, the monitoring cameras 1-31 and 1-32 and the emergency call devices 2-31 and 2-32 are connected to the relay 6-3 via the in-vehicle communication path.

The information control device 3 is connected to the display unit 4 and the relay 6 via the in-vehicle communication path. In FIG. 3, the information control device 3 is configured to include a table 10, an IP-address specifying unit 11, and an imaging-data selection unit 12.

Upon receiving the call signal 2a from the emergency call device 2, the IP-address specifying unit 11 refers to the table 10 and, according to the IP address of the emergency call device 2 included in the call signal 2a, specifies, from the monitoring cameras 1 installed in the vehicle, the IP address of one or a plurality of monitoring cameras 1 that take images of the in-vehicle status including the operated emergency call device 2.

The imaging-data selection unit 12 selects only imaging data 1a from the monitoring camera 1 having the IP address specified by the IP-address specifying unit 11 from the pieces of imaging data 1a transmitted from the monitoring cameras 1 and transmits the selected imaging data 1a to the display unit 4.

FIG. 4 shows installation examples of the monitoring cameras and the emergency call devices. In the vehicle 5-1 shown in FIG. 4(a), for example, four monitoring cameras 1-11 to 1-14 and four emergency call devices 2-11 to 2-14 are installed. The emergency call devices 2 are installed near vehicle doors 7, the monitoring cameras 1-11 and 1-14 are provided on the vehicle traveling direction sides, and the monitoring cameras 1-12 and 1-13 are provided in the central part of the vehicle. The monitoring cameras 1-12 and 1-13 are arranged to face the imaging direction (the direction shown by the arrows) of the monitoring cameras 1-11 and 1-14.

The emergency call device 2-11 is installed at a position where the monitoring cameras 1-11 and 1-12 can take images thereof, the emergency call device 2-12 is installed at a position where the monitoring cameras 1-11 and 1-14 can take images thereof, the emergency call device 2-13 is installed at a position where the monitoring cameras 1-13 and 1-14 can take images thereof, and the emergency call device 2-14 is installed at a position where the monitoring cameras 1-13 and 1-11 can take images thereof. Accordingly, the emergency call device 2-12, which is not present within the imaging range of the monitoring cameras 1-12 and 1-13, can be imaged by the monitoring cameras 1-11 and 1-14.

In the vehicle 5-1 shown in FIG. 4(b), the monitoring cameras 1-12 and 1-13 shown in FIG. 4(a) are omitted, and two monitoring cameras 1-11 and 1-14 and four emergency call devices 2-11 to 2-14 are installed. In this case, the emergency call device 2-14, which is not present within the imaging range of the monitoring camera 1-14, can be imaged by the monitoring camera 1-11.

In the vehicle 5-1 shown in FIG. 4(c), two monitoring cameras 1-15 and 1-16 installed in the central part of the vehicle such that the imaging directions thereof are opposite to each other, and four emergency call devices 2-11 to 2-14 are installed. In this case, the emergency call device 2-12, which is not present within the imaging range of the monitoring camera 1-15, can be imaged by the monitoring camera 1-16.

In the vehicle 5-1 shown in FIG. 4(d), four monitoring cameras 1-17 to 1-20 installed on the side surfaces of the vehicle such that the imaging directions thereof are directed toward the side surfaces of the vehicle, and four emergency call devices 2-11 to 2-14 are installed. In this case, the emergency call device 2-11, which is not present within the imaging range of the monitoring camera 1-18, can be imaged by the monitoring camera 1-17.

FIG. 5 shows IP addresses of the respective devices shown in FIG. 4(a). FIG. 6 shows an example of the table 10 in which these IP addresses are associated with one another. In the table 10, the IP addresses of the emergency call devices 2 and the IP addresses of the monitoring cameras 1 are stored in association with serial numbers 1, 2, . . . , and n (n is an integer excluding 0).

The operation is explained with reference to FIG. 7. The IP-address specifying unit 11 of the information control device 3 first determines whether the call signal 2a from the emergency call device 2 has been received. For example, when the emergency call device 2-11 having an IP address "192.168.70.101" is operated, the call signal 2a from the emergency call device 2-11 is transmitted to the IP-address specifying unit 11.

Upon receiving the call signal 2a (YES at Step S1), the IP-address specifying unit 11 specifies, from the monitoring cameras 1, the monitoring cameras 1-11, 1-12, and 1-14 having IP addresses "192.168.70.1", "192.168.70.2", and "192.168.70.4", which can take images of the in-vehicle status including the emergency call device 2-11 having the IP address included in the call signal 2a, according to the IP address included in the call signal 2a and the table 10 (Step S2).

The imaging-data selection unit 12 selects the imaging data 1a from the monitoring cameras 1-11, 1-12, and 1-14 specified at Step S2 from the pieces of imaging data 1a transmitted from the monitoring cameras 1 and transmits the selected imaging data 1a to the display unit 4 (Step S3). The display unit 4 having received the imaging data 1a displays a plurality of images taken by the monitoring cameras 1 having the IP addresses described above (Step S4).

Because the positional relationships between the monitoring cameras 1 and the emergency call devices 2 are different for each vehicle, it is desirable to configure the information control device 3 to select the imaging data 1a from the monitoring camera 1 by using a plurality of tables 10, each created for each vehicle.

As described above, the in-vehicle monitoring system according to the present embodiment includes the monitoring cameras 1 and the emergency call devices 2 mounted on the vehicle of a train, the display unit 4 that displays information transferred within the vehicle, and the information control device 3 that transmits the imaging data 1a from the monitoring cameras 1 to the display unit 4, and that monitors the inside of the vehicle by using the images taken by the monitoring cameras 1. The table 10, in which the IP addresses of the emergency call devices 2 and the IP addresses of the monitoring cameras 1 are stored in association with each other in a one-to-one relationship or a one-to-many relationship, is set in the information control device 3. Upon receiving the call signal 2a from the operated emergency call device 2, the information control device 3 specifies the IP address of the monitoring camera 1 corresponding to the operated emergency call device 2 from the IP addresses of the monitoring cameras 1 on the basis of the table 10, selects the imaging data 1a from the specified monitoring camera 1 from the pieces of imaging data 1a from the monitoring cameras 1, and transmits the selected imaging data 1a to the display unit 4. With this configuration, the monitoring cameras 1 and the emergency call devices 2 can cooperate with each other by using the in-train network, and more detailed images of the in-vehicle status in the vicinity of the operated emergency call device 2 can be taken.

Second Embodiment.

A second embodiment describes a configuration example using a multicast method capable of performing communication from a predetermined terminal to a plurality of other terminals. Digital data to be sent to multicast addresses is referred to as a "multicast packet". The second embodiment is different from the first embodiment in that each monitoring camera 1 transmits the imaging data 1a to a multicast address assigned in a second table 21 described later, and an information control device 3A is configured to assign a multicast address related to the operated emergency call device 2 on the basis of a first table 20 described later and receive a multicast packet from the multicast address. In the following descriptions, identical parts as those according to the first embodiment are designated by like reference signs and explanations thereof will be omitted, and only different parts from the first embodiment are explained.

Figure 8:
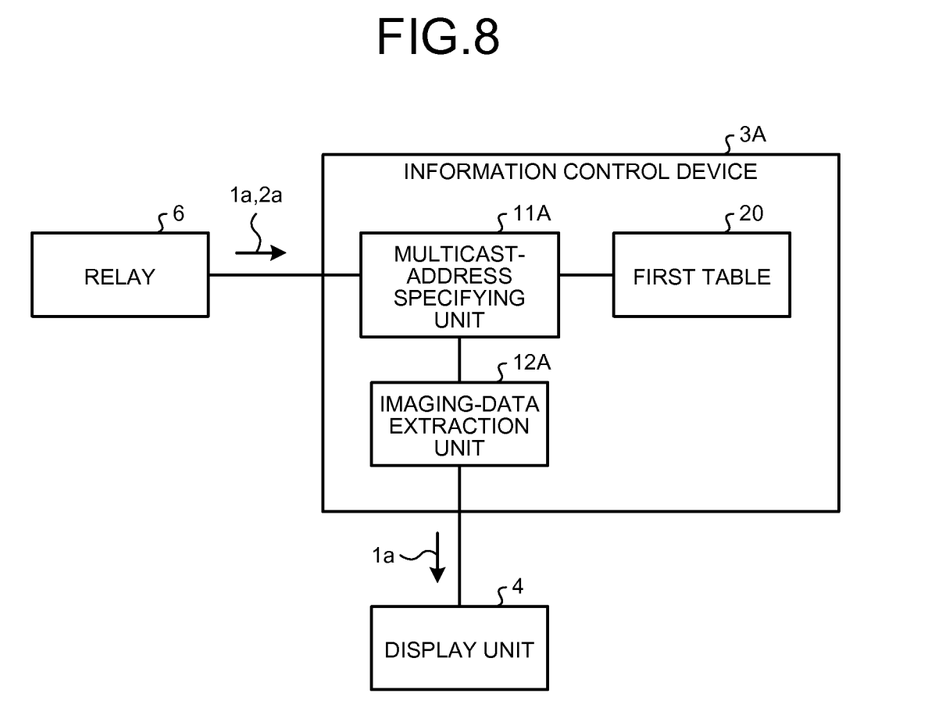
FIG. 8 is a configuration diagram of an information control device according to a second embodiment of the present invention.

FIG. 8 is a configuration diagram of an information control device according to the second embodiment of the present invention. The information control device 3A is configured to include a multicast-address specifying unit 11A, an imaging-data extraction unit 12A, and the first table 20.

Figure 9:
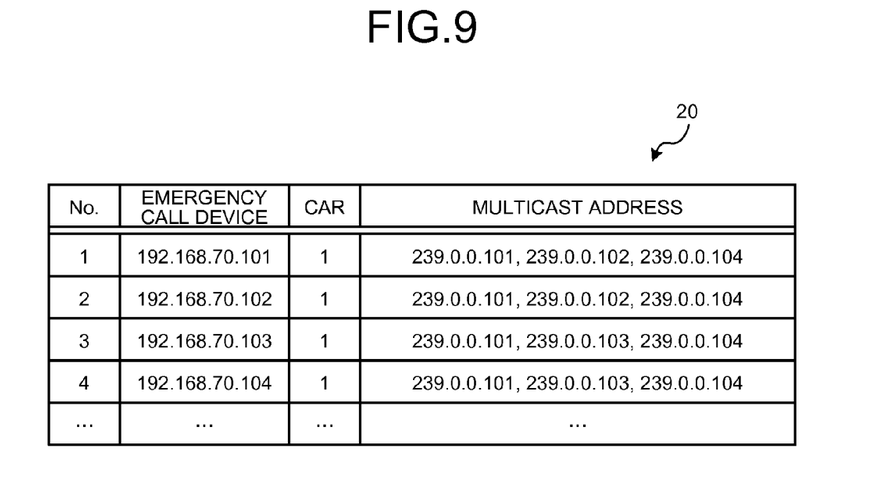
FIG. 9 is a diagram showing the configuration of a first table.

FIG. 9 is a diagram showing the configuration of the first table. The first table 20 is for assigning an address of the multicast domain related to the emergency call device 2. In the first table 20, as an example, IP addresses of a plurality of emergency call devices 2 installed in the first car and a plurality of multicast addresses are stored in association with serial numbers 1, 2, . . . , and n (n is an integer excluding 0).

Figure 10:
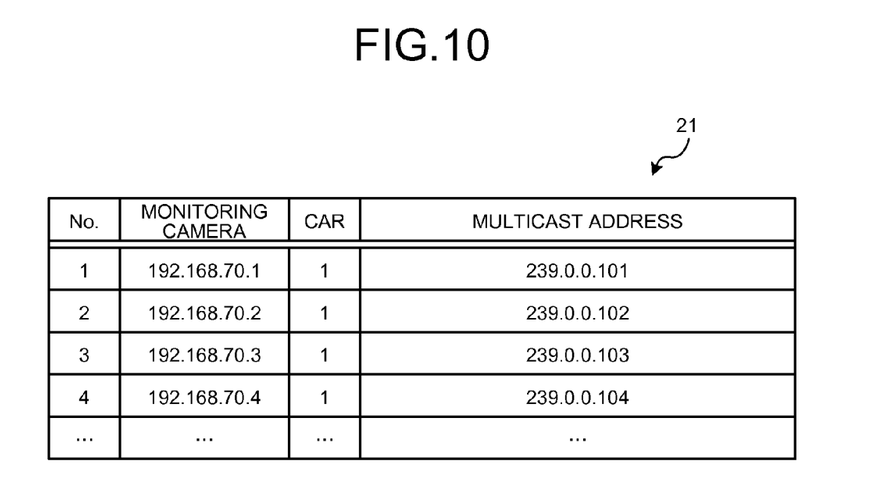
FIG. 10 is a diagram showing the configuration of a second table.

FIG. 10 is a diagram showing the configuration of the second table. The second table 21 is for setting to which multicast address the monitoring camera 1 transmits the imaging data 1a. In the second table 21, as an example, the IP addresses of the monitoring cameras 1 installed in the first car and the multicast addresses are stored in association with serial numbers 1, 2, . . . , and n (n is an integer excluding 0).

Figure 11:
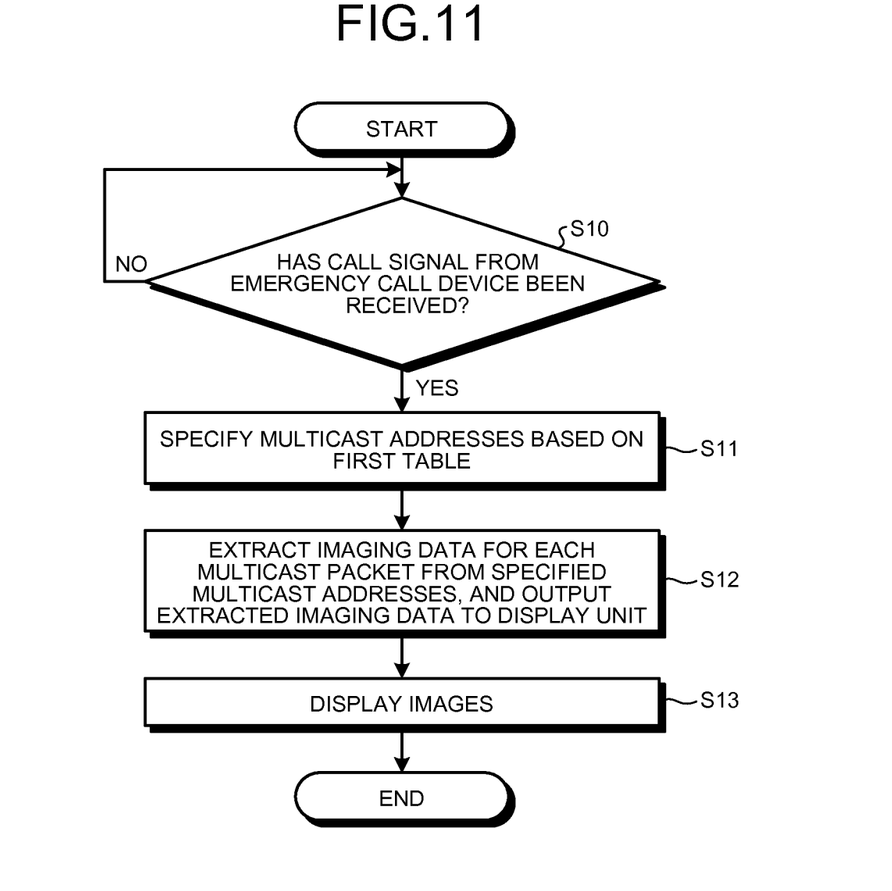
FIG. 11 is a flowchart showing an operation of the in-vehicle monitoring system according to the second embodiment of the present invention.

FIG. 11 is a flowchart showing an operation of the in-vehicle monitoring system according to the second embodiment of the present invention. The operation is explained below with reference to FIG. 11. The multicast-address specifying unit 11A determines whether the call signal 2a from the emergency call device 2 has been received (Step S10). For example, when the emergency call device 2 having an IP address "192.168.70.101" is operated, the call signal 2a from the emergency call device 2 is transmitted to the multicast-address specifying unit 11A.

Upon receiving the call signal 2a (YES at Step S10), the multicast-address specifying unit 11A specifies multicast addresses "239.0.0.101", "239.0.0.102", and "239.0.0.104" corresponding to the IP address of the emergency call device 2 as the source of the call signal 2a on the basis of the first table 20 (Step S11).

The multicast-address specifying unit 11A assigns the specified multicast addresses and receives multicast packets only from the multicast addresses. The multicast packet includes, for example, the imaging data 1a from the monitoring cameras 1 having IP addresses "192.168.70.1", "192.168.70.2", and "192.168.70.4".

The imaging-data extraction unit 12A extracts the imaging data 1a from the multicast packets and outputs the extracted imaging data 1a to the display unit 4 (Step S12). Accordingly, the imaging data 1a from the assigned multicast addresses is transmitted to the display unit 4, and the display unit 4 having received the imaging data 1a displays a plurality of images taken by the monitoring cameras 1 (Step S13).

As described above, the in-vehicle monitoring system according to the present embodiment includes the monitoring cameras 1 and the emergency call devices 2 mounted on the vehicle of a train, the display unit 4 that displays information transferred within the vehicle, and the information control device 3 that transmits the imaging data 1a from the monitoring cameras 1 to the display unit 4, and that monitors the inside of the vehicle by using the images taken by the monitoring cameras 1. The first table 20, in which the IP addresses of the emergency call devices 2 and the multicast addresses are stored in association with each other in a one-to-one relationship or a one-to-many relationship, is set in the information control device 3. The second table 21, in which the IP addresses of the monitoring cameras 1 and the multicast addresses are stored in association with each other, is set in the monitoring camera 1. The monitoring camera 1 transmits the imaging data 1a to the multicast address corresponding to the IP address in the second table 21. Upon receiving the call signal 2a from the operated emergency call device 2, the information control device 3 specifies a multicast address corresponding to the operated emergency call device 2 from the multicast addresses on the basis of the first table 20 and transmits the imaging data 1a in the multicast packets transmitted from the specified multicast address to the display unit 4. Even when the multicast addresses are used in such a manner, the monitoring cameras 1 and the emergency call devices 2 can cooperate with each other, and the effects similar to those of the first embodiment can be acquired.

Third Embodiment.

In the second embodiment, the in-vehicle monitoring system is configured to transmit the pieces of imaging data 1a transmitted from the assigned multicast address to the display unit 4. However, because the size of the display unit 4 installed in the cab is about a dozen inches, when several camera images are simultaneously displayed, the driver has trouble viewing the images.

In the information control device 3 according to a third embodiment, data on a graphic as shown, for example, in FIG. 4(a), i.e., data on a graphic schematically expressing the installation state of the emergency call devices 2 and the monitoring cameras 1 is set for each vehicle. For example, when a predetermined emergency call device 2 in the first car is operated, the information control device 3 outputs graphic data corresponding to the vehicle (the first car) in which the emergency call device 2 as the source of the call signal is installed to the display unit 4. The display unit 4 displays the monitoring cameras 1 and the emergency call devices 2 in the vehicle on the basis of the graphic data, and when the monitoring camera 1 displayed on the screen is operated, enlarges and displays only the images from the monitoring camera 1. Accordingly, only the images taken by a specific monitoring camera 1 can be displayed on the display unit 4, and an incident or the like that has occurred in the vehicle can be promptly checked.

Fourth Embodiment.

Because the recording capacity of a data recording device (not shown) mounted on a train is limited, the data recording device deletes the imaging data 1a after recording the imaging data 1a for a certain period. The information control device 3 according to the third embodiment is configured to attach a flag indicating not to delete the imaging data 1a taken during a certain period before and after the start point when the emergency call device 2 is operated, to imaging data from the monitoring camera specified by the information control device 3 according to the first embodiment (or attach the flag to the imaging data from the multicast address specified by the information control device 3A according to the second embodiment) and causes the data recording device to record the imaging data 1a.

With this configuration, the imaging data 1a to which the flag is not attached can be deleted; therefore, investigation of an incident or the like can be conducted by using the images taken during a certain period before and after the point in time when the incident or the like has occurred, while efficiently using the recording capacity of the data recording device.

The tables (10, 20, and 21) used in the first to fourth embodiments are updated by a device on the ground (not shown), and the updated tables are recorded in the information control devices (3 and 3A) via a ground wireless device and a vehicle wireless device (not shown). For example, due to similar incidents or the like having occurred several times in a specific vehicle, when the table is updated on the ground side such that the monitoring cameras can concentrate on taking images of the vicinity of the emergency call device 2 installed at the place, the information control device can select an image to be displayed on the display unit 4 by using the latest table.

The information control devices according to the embodiments of the present invention are only examples of the content of the present invention and it is obvious that they can be combined with other publicly known technologies and can be changed, for example, by omitting a part thereof without departing from the scope of the present invention.

INDUSTRIAL APPLICABILITY

As described above, the present invention is mainly applicable to an information control device, and is particularly useful as an invention capable of taking more detailed images of an in-vehicle status and displaying the taken images.

REFERENCE SIGNS LIST 1, 1-11, 1-12, 1-13, 1-14, 1-15, 1-16, 1-17, 1-18, 1-19, 1-20, 1-21, 1-22, 1-31, 1-32 monitoring camera, 1a imaging data, 2, 2-11, 2-12, 2-13, 2-14, 2-21, 2-22, 2-31, 2-32 emergency call device, 2a call signal, 3, 3A information control device, 4 display unit, 5, 5-1, 5-2, 5-3 vehicle, 6, 6-1, 6-2, 6-3 relay, 7 vehicle door, 10 table, 11 IP-address specifying unit, 11A multicast-address specifying unit, 12 imaging-data selection unit, 12A imaging-data extraction unit, 20 first table, 21 second table.

The invention claimed is:

1. An in-vehicle monitoring system that comprises: a plurality of monitoring cameras and a plurality of emergency call devices mounted on a vehicle of a train; a display unit that displays information transferred within the vehicle; and an information control device that transmits imaging data from the monitoring cameras to the display unit, and that monitors inside of the vehicle by using images taken by the monitoring cameras, wherein
a table, in which an IP address of a same monitoring camera is stored in association with IP addresses of two or more emergency call devices and an IP address of a same emergency call device is stored in association with IP addresses of two or more monitoring cameras, is set in the information control device, and
upon receiving a call signal from an operated emergency call device, the information control device specifies IP addresses of two or more monitoring cameras corresponding to an IP address of an emergency call device included in the call signal from IP addresses of the monitoring cameras by referring to the table, selects imaging data from monitoring cameras having specified IP from pieces of imaging data from the monitoring cameras, and transmits selected imaging data to the display unit.

2. An in-vehicle monitoring system that comprises: a plurality of monitoring cameras and a plurality of emergency call devices mounted on a vehicle of a train; a display unit that displays information transferred within the vehicle; and an information control device that transmits imaging data from the monitoring cameras to the display unit, and that monitors inside of the vehicle by using images taken by the monitoring cameras, wherein
a first table, in which an IP address of one emergency call device is stored in association with two or more multicast addresses and a multicast address associated with an IP address of one emergency call device is also stored in association with another emergency call device, is set in the information control device,
a second table, in which multicast addresses in the first table are stored in association with IP addresses of the monitoring cameras, respectively, is set in the monitoring camera,
the monitoring camera transmits imaging data to a multicast address corresponding to an IP address in the second table, and
upon receiving a call signal from an operated emergency call device, the information control device specifies two or more multicast addresses corresponding to an IP address of an emergency call device as a source of the call signal from a plurality of multicast addresses by referring to the first table and transmits imaging data in a multicast packet transmitted from specified multicast addresses to the display unit.

3. The in-vehicle monitoring system according to claim 1, wherein
graphic data schematically expressing an installation state of emergency call devices and monitoring cameras in a vehicle is set in the information control device for each vehicle,
upon receiving the call signal, the information control device outputs the graphic data corresponding to a vehicle in which an emergency call device as a source of the call signal is installed to the display unit, and
the display unit displays emergency call devices and monitoring cameras in the vehicle on a basis of the graphic data, and when a monitoring camera displayed on a screen is operated, displays an image taken by the monitoring camera.

4. The in-vehicle monitoring system according to claim 1, wherein the information control device attaches a flag indicating not to delete imaging data taken during a certain period before and after a start point when the emergency call device is operated to imaging data from specified monitoring cameras and causes a data recording device mounted on a train to record the imaging data.

5. The in-vehicle monitoring system according to claim 2, wherein the information control device attaches a flag indicating not to delete imaging data taken during a certain period before and after a start point when the emergency call device is operated to the imaging data in a multicast packet transmitted from specified multicast addresses and causes a data recording device mounted on a train to record the imaging data.

6. An in-vehicle monitoring method executed in an in-vehicle monitoring system that comprises a plurality of monitoring cameras and a plurality of emergency call devices mounted on a vehicle of a train and a display unit that displays information transferred within the vehicle, and that monitors inside of the vehicle by using images taken by the monitoring cameras, the method comprising:
- specifying, upon receiving a call signal from an operated emergency call device, IP addresses of two or more monitoring cameras corresponding to an IP address of an emergency call device included in the call signal from IP addresses of the monitoring cameras by referring to a table in which an IP address of a same monitoring camera is stored in association with IP addresses of two or more emergency call devices and an IP address of a same emergency call device is stored in association with IP addresses of two or more monitoring cameras;
- selecting, from pieces of imaging data from the monitoring cameras, imaging data transmitted from monitoring cameras having -IP addresses specified at the specifying; and
- transmitting imaging data selected at the selecting to the display unit.

7. An in-vehicle monitoring method executed in an in-vehicle monitoring system that comprises a plurality of monitoring cameras and a plurality of emergency call devices mounted on a vehicle of a train and a display unit that displays information transferred within the vehicle, and that monitors inside of the vehicle by using images taken by the monitoring cameras, the method comprising:
- transmitting imaging data to a multicast address corresponding to an IP address in a table, in which IP addresses of the monitoring cameras and multicast addresses are stored in association with each other, on a basis of the table;
- specifying, upon receiving a call signal from an operated emergency call device, a multicast address corresponding to an IP address of an emergency call device as a source of the call signal from a plurality of multicast addresses on a basis of a table in which an IP address of one emergency call device is stored in association with two or more multicast addresses and a multicast address associated with an IP address of one emergency call device is stored in association with another emergency call device; and
- transmitting imaging data in a multicast packet transmitted from a multicast address-specified at the specifying to the display unit.

8. The in-vehicle monitoring system according to claim 2, wherein
- graphic data schematically expressing an installation state of emergency call devices and monitoring cameras in a vehicle is set in the information control device for each vehicle,
- upon receiving the call signal, the information control device outputs the graphic data corresponding to a vehicle in which an emergency call device as a source of the call signal is installed to the display unit, and
- the display unit displays emergency call devices and monitoring cameras in the vehicle on a basis of the graphic data, and when a monitoring camera displayed on a screen is operated, displays an image taken by the monitoring camera.

\* \* \* \* \*